United States Patent [19]
Ueda et al.

[11] Patent Number: 5,705,601
[45] Date of Patent: Jan. 6, 1998

[54] PROCESS FOR PRODUCING POLYESTER FILM

[75] Inventors: Atsuko Ueda, Aichi; Tetsuo Matsumoto, Nara, both of Japan

[73] Assignee: Nippon Ester Co., Ltd., Okazaki, Japan

[21] Appl. No.: 650,902

[22] Filed: May 17, 1996

[51] Int. Cl.⁶ .................... C08G 63/85; C08G 63/16; B29C 39/00; C08J 3/20
[52] U.S. Cl. .................... 528/308.2; 528/283; 528/285; 528/308.3; 521/48.5; 523/351; 264/299
[58] Field of Search .................... 521/48.5; 523/351; 528/283, 285, 308.2, 308.3; 264/299

[56] References Cited

U.S. PATENT DOCUMENTS

| | | | |
|---|---|---|---|
| 3,951,886 | 4/1976 | Miyake et al. | 521/48.5 |
| 4,985,538 | 1/1991 | Fukuda et al. | 528/308.2 |
| 5,451,611 | 9/1995 | Chilukuri et al. | 521/48.5 |

FOREIGN PATENT DOCUMENTS

| | | |
|---|---|---|
| 53-40231 | 10/1978 | Japan . |
| 55-84322 | 6/1980 | Japan . |
| 56-15730 | 4/1981 | Japan . |
| 63-66859 | 12/1988 | Japan . |
| 6-80771 | 3/1994 | Japan . |
| 6-313031 | 11/1994 | Japan . |
| 7-21099 | 3/1995 | Japan . |

Primary Examiner—Tae Yoon
Attorney, Agent, or Firm—Sughrue, Mion, Zinn, Macpeak & Seas

[57] ABSTRACT

A process for producing a polyester film is disclosed, which comprises melt-mixing from 3 to 12 parts by weight of a master polymer comprising a poly(alkylene terephthalate) which contains from 0.3 to 3 wt % inorganic lubricant and has an intrinsic viscosity of 0.5 or higher with from 97 to 88 parts by weight of a poly(alkylene terephthalate) containing no inorganic lubricant and having an intrinsic viscosity of 0.5 or higher, and forming the resulting mixture into a film by the electrostatic casting method. The master polymer is obtained by a process comprising adding to a poly(alkylene terephthalate) oligomer having an average degree of polymerization of 10 or lower an alkylene glycol slurry of an inorganic lubricant and specific amounts of a potassium compound and a phosphorus compound, depolymerizing the oligomer, subsequently adding specific amounts of antimony trioxide and germanium dioxide, and then effecting polycondensation. By this process, a polyester film having an excellent color tone can be produced with a high producibility and a high operation efficiency.

13 Claims, 1 Drawing Sheet

PROCESS FOR PRODUCING POLYESTER FILM

FIELD OF THE INVENTION

The present invention relates to a process for producing a polyester film by which a polyester film having an excellent color tone can be produced with a high production rate and a high operation efficiency.

BACKGROUND OF THE INVENTION

Polyesters, in particular poly(alkylene terephthalate)s, are now extensively used as films, because they have a high degree of crystallinity and a high softening point and are excellent in strength, chemical resistance, heat resistance, weatherability, electrical insulation resistance, and other properties.

Polyester films are required to have a high operation efficiency in film production steps including melt extrusion, taking-up, stretching, and heat treatment; to have sufficient heat resistance and a high operation efficiency in various coating operations including formation of a magnetic layer and vapor deposition of a metal; and to have an excellent slip property, transparency and color tone as well as a satisfactory surface state in final products.

Biaxially stretched polyester films are produced by extruding a polyester into a sheet form with a melting extruder, cooling the extrudate to effect solidification, and then biaxially stretching the sheet in the machine and transverse directions either simultaneously or successively. In this process, for the purpose of obtaining a film having uniformity in thickness and intact transparency, the electrostatic casting method is usually employee in which the sheet melt-extruded from an extrusion die orifice is passed through rotating cooling drums while applying a high voltage to the sheet to thereby deposit electrostatic charges on the surface of the unsolidified sheet, which is then rapidly cooled with a grounded cooling drum while being kept in close contact therewith.

The productivity of polyester film is determined by the rate of casting, in the case where the film thickness is constant. Accordingly, it is extremely important to increase the casting rate in order to improve the productivity. Namely, it is important to improve the electrostatic casting property.

A generally employed method for improving the electrostatic casting property of a polyester is to add a metal salt having a positive charge to the polyester. Examples thereof include a method in which polycondensation is carried out in the presence of suitable amounts of a magnesium compound or manganese compound and an alkali metal compound or phosphorus compound to thereby obtain a molten polyester having reduced resistivity and showing an improved electrostatic casting property, as disclosed in JP-B-56-15730 and JP-A-55-84322. (The term "JP-B" and "JP-A" as used herein mean an "examined Japanese patent publication" and "unexamined published Japanese patent application," respectively.) Although this method is effective to a certain degree in improving the electrostatic casting property, it has a disadvantage that magnesium compounds, manganese compounds, and the like all function to catalyze pyrolysis reactions of polyesters.

Polyesters containing such compounds which accelerate pyrolysis reactions have a problem that, during film production, the polymer thermally deteriorates in the polymer retaining part and this deteriorated polymer not only causes bubbles to result in a film with considerable surface roughness, but also gives a colored film. In particular, film production using a temperature as high as 290° C. or higher has a problem that, due to the deteriorated polymer, stable operation over a prolonged period exceeding 3 months is extremely difficult.

On the other hand, potassium compounds such as potassium acetate impart a satisfactory electrostatic casting property to polyesters and catalyze pyrolysis reactions to a lesser degree, so that they are free from the problem of the acceleration of pyrolysis reactions as is the case with magnesium compounds and manganese compounds. However, the potassium compounds react with the polycondensation catalyst and other ingredients used for polyester production to form polyester-insoluble particles during polymerization. These particles participate not only to considerably reduce film transparency, but also to accelerate the increase in a pressure imposed on the filter during film production, resulting in a reduced operation efficiency. Because of the above, the potassium compounds have not been used.

As described above, it has been extremely difficult to produce a polyester film having an excellent color tone (transparency) while attaining a high productivity and a high operation efficiency.

In polyester film production, it is necessary to use a polyester containing a lubricant for imparting slip properties to the film. The method generally employed for this purpose comprises synthesizing a polyester in the presence of a large amount of a lubricant to produce a master polymer, mixing this master polymer with a lubricant-free polyester (base polymer), and forming the mixture into a film. As stated above, for a high production rate of a polyester film with a high operation efficiency, it is necessary to use a polyester having a satisfactory electrostatic casting property and it is desirable to add additives for imparting an electrostatic casting property to a master polymer.

SUMMARY OF THE INVENTION

An object of the present invention is to provide a process by which a polyester film having an excellent color tone can be produced with a high production rate and a high operation efficiency.

As a result of extensive studies to overcome the problems described above, the present inventors found that the above object is accomplished by using as a master polymer a polyester synthesized by a process in which an inorganic lubricant for imparting slip properties to a film, a potassium compound for imparting the electrostatic casting property, a phosphorus compound as a heat stabilizer, and antimony trioxide and germanium dioxide as polycondensation catalysts are added in specific amounts in a specific manner. The present invention has been achieved based on this finding.

The aspects of the present invention are as follows.

1. A process for producing a master polymer for film production which comprises: adding to a poly(alkylene terephthalate) oligomer having an average degree of polymerization of 10 or lower an alkylene glycol slurry of an inorganic lubricant, a potassium compound, and a phosphorus compound, the addition amounts of the potassium compound and the phosphorus compound satisfying the following expressions (1) to (3); depolymerizing the oligomer; adding antimony trioxide and germanium dioxide in respective amounts satisfying the following expressions (4) to (6); and then effecting polycondensation.

$$5 \times 10^{-4} \leq a \leq 50 \times 10^{-4} \quad (1)$$
$$2.5 \times 10^{-4} \leq b \leq 25 \times 10^{-4} \quad (2)$$
$$0.15 \leq b/a \leq 1.5 \quad (3)$$
$$c \leq 2.5 \times 10^{-4} \quad (4)$$
$$0.5 \times 10^{-4} \leq d \leq 5 \times 10^{-4} \quad (5)$$
$$2.5 \times 10^{-4} \leq (c+d) \leq 5 \times 10^{-4} \quad (6)$$

wherein a, b, c, and d are the molar amounts of the potassium compound, phosphorus compound, antimony trioxide, and germanium dioxide, respectively, per mol of the terephthalic acid component constituting the oligomer.

2. A process for producing a polyester film which comprises: melt-mixing from 3 to 12 parts by weight of the master polymer comprising a poly(alkylene terephthalate) obtained by the process described above which contains from 0.3 to 3 wt % inorganic lubricant and has an intrinsic viscosity of 0.5 or higher with from 97 to 88 parts by weight of a poly(alkylene terephthalate) containing no inorganic lubricant and having an intrinsic viscosity of 0.5 or higher; and forming the resulting mixture into a film by the electrostatic casting method.

Figure 1:
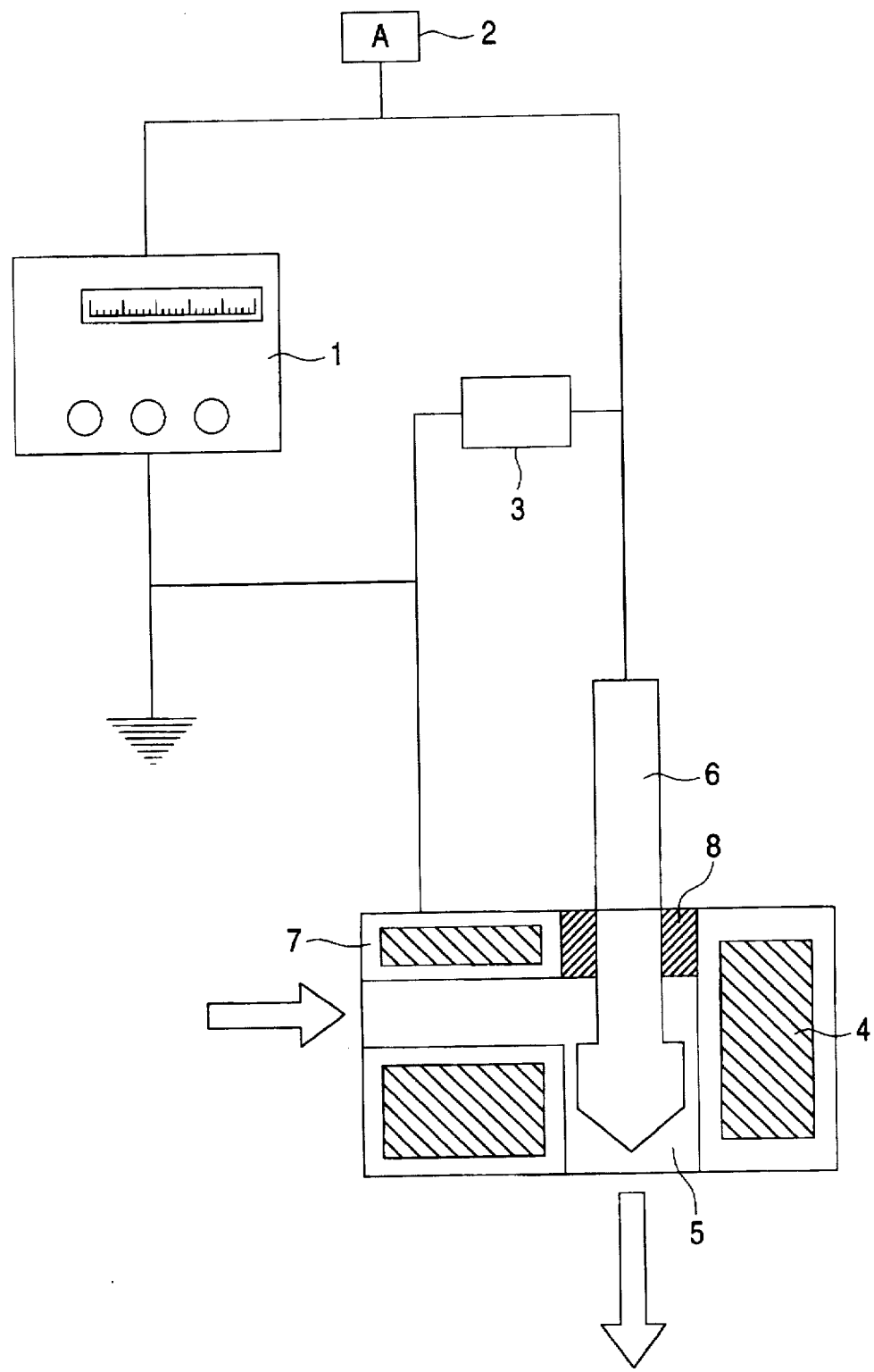
FIG. 1 is a view illustrating an apparatus for measuring the resistivity of a molten polymer.

| | |
|---|---|
| 1 | direct current high-voltage generator |
| 2 | electrometer |
| 3 | high-voltage voltmeter |
| 4 | heating medium |
| 5 | polymer to be examined |
| 6 | cylindrical electrode |
| 7 | grounded main electrode |
| 8 | insulator |

DETAILED DESCRIPTION OF THE INVENTION

Hereinafter, the present invention is described in detail.

The poly(alkylene terephthalate) used in the present invention is preferably poly(ethylene terephthalate). However, the poly(alkylene terephthalate) may contain a small amount (up to about 10 mol % based on the total amount of the copolymer component) of comonomer units derived from another dicarboxylic acid component (e.g., isophthalic acid, phthalic anhydride, naphthalenedicarboxylic acid, diphenyl sulfonedicarboxylic acid, adipic acid, or sebacic acid) or from another glycol component (e.g., tetramethylene glycol, neopentyl glycol, or 1,4-cyclohexanedimethanol).

An inorganic lubricant having satisfactory heat resistance may be used as the lubricant. Examples thereof include known inert particles of an inorganic material such as kaolin, clay, calcium carbonate, silica, aluminum oxide, titanium oxide, or calcium phosphate. Especially preferred is silica.

For avoiding aggregation, the inorganic lubricant should be added in the form of a slurry in an alkylene glycol to a poly(alkylene terephthalate) having an average degree of polymerization of 10 or lower. If the inorganic lubricant is added to an oligomer having a degree of polymerization exceeding 10, the inorganic lubricant cannot be evenly dispersed. The average degree of polymerization is more preferably from 2 to 10. The term "an average degree of polymerization" as used herein means a number average degree of polymerization. The number average degree of polymerization is calculated from the intrinsic viscosity [η] based on the Koepp Werner equation shown below.

$$[\eta] = 7.55 \times 10^{-4} \times Mn^{0.685}$$

The concentration of the inorganic lubricant in the slurry is preferably adjusted to 10% by weight or lower based on the total amount of the slurry.

The addition amount of the inorganic lubricant is preferably from 0.3 to 3% by weight based on the total amount of the master polymer (i.e., the master polymer and the inorganic lubricant). If the addition amount thereof is smaller than 0.3% by weight, the blending amount of the resulting master polymer should be considerably increased in order to obtain a film having sufficient slip properties, which is uneconomical. On the other hand, if the addition amount thereof exceeds 3% by weight, the inorganic lubricant aggregates in the polymer, resulting in a significantly reduced operation efficiency during film production.

Examples of the potassium compound include carboxylic acid salts of potassium, such as potassium acetate, potassium propionate, potassium stearate, and potassium benzoate. Especially preferred is potassium acetate.

The addition amount of the potassium compound should be in the range defined by expression (1). Too small addition amounts thereof are undesirable in that the resistivity of the polyester cannot be virtually reduced. On the other hand, too large addition amounts thereof are undesirable in that not only is the transparency of the polyester impaired but also the rate of the polycondensation reaction becomes lower.

Examples of the phosphorus compound include phosphoric acid, phosphorous acid, and derivatives thereof. Specific examples thereof include phosphoric acid, phosphorous acid, n-butyl phosphate, diisopropyl phosphate, monoisopropyl phosphate, monooctyl phosphate, dioctyl phosphate, trimethyl phosphate, triethyl phosphate, dibutyl hydrogen phosphite, and triphenyl phosphite. Preferred are phosphoric triesters, in particular triethyl phosphate.

The addition amount of the phosphorus compound should be in the range defined by expression (2). Too small addition amounts thereof are undesirable in that the thermal stability of the polyester cannot be virtually improved. On the other hand, too large addition amounts thereof are undesirable in that the electrostatic casting property is impaired.

The addition amounts of the potassium compound and the phosphorus compound should not only satisfy expressions (1) and (2) respectively, but also satisfy the relationship defined by expression (3). If the ratio of the phosphorus compound amount to the potassium compound amount is smaller than the lower limit shown in expression (3), the heat resistance of the polyester is impaired. Values of that ratio larger than the upper limit are undesirable in that the electrostatic casting property and transparency are impaired.

The antimony trioxide and germanium dioxide used as polycondensation catalysts in master polymer production should be added in respective amounts which satisfy expressions (4) to (6). If the addition amount of antimony trioxide is too large, coarse particles are generated, resulting in an impaired operation efficiency in film production due to the accelerated increase in filtration pressure, etc. Too small addition amounts of germanium dioxide are undesirable in that the rate of the polycondensation reaction for yielding a polyester becomes lower, while too large amounts thereof are undesirable in that not only does the rate of the polycondensation reaction become too high, making polymer quality control difficult, but also the cost is increased. The range of the addition amount of antimony trioxide is more preferably from $0.1 \times 10^4$ to $1.5 \times 10^4$.

When a phosphorus compound and antimony trioxide coexist, they interact with the poly(alkylene terephthalate) to yield coarse particles insoluble in the poly(alkylene terephthalate). This is avoided in the present invention by carrying out depolymerization after the addition of an alkylene glycol slurry of an inorganic lubricant, a potassium compound, and a phosphorus compound, and adding antimony trioxide after the depolymerization.

In the process described above, the depolymerization is desirably conducted for at least 30 minutes in an inert gas atmosphere (e.g., nitrogen or argon), preferably in a continuous stream of such inert gas, at ordinary to an elevated pressure, preferably at an elevated pressure of about 1,050 hPa, and at a temperature of 260° C. or higher. The depolymerization for from 30 to 120 minutes at a temperature of from 260° to 300° C. is especially preferable.

Polycondensation is desirably carried out usually for at least 120 minutes, at a reduced pressure of from 0.01 to 13 hPa and a temperature of from 260° to 300° C.

In combination with the additives described above, other additives such as a colorant, a light stabilizer, an antioxidant, and an antifoaming agent may be used.

The master polymer and the base polymer each should have an intrinsic viscosity of 0.5 or higher, and a master polymer having an intrinsic viscosity of from 0.5 to 1.0 is particularly preferable. If the intrinsic viscosity of either polymer is lower than 0.5, a film having sufficient strength is not obtainable.

A film is produced by melt-mixing from 97 to 88 parts by weight of a base polymer with from 3 to 12 parts by weight of the master polymer containing from 0.3 to 3 wt % inorganic lubricant (based on the total amount of the master polymer and the inorganic lubricant), and forming the resulting mixture into a film by the electrostatic casting method. Too small proportions of the master polymer are undesirable in that the electrostatic casting property becomes insufficient, while too large proportions thereof are undesirable in that the operation efficiency in film production is impaired and the cost is increased.

Although the master polymer and the base polymer may be mixed at any stage in the period of from pellet drying to film production, it is preferable to use a method in which the polymers are separately dried and melted and then melt-mixed with each other by means of a melting extruder before being formed into a film.

For the electrostatic casting, a known apparatus and known conditions may be used (see, for example, JP-B-37-6142).

In the present invention, since a potassium compound which functions to a lesser degree to catalyze pyrolysis reactions of polyesters is used as an additive for imparting the electrostatic casting property, the polyester is inhibited from undergoing pyrolysis during melt extrusion, so that foaming caused by a decomposition gas and the generation of an undesirable substance due to polyester decomposition are inhibited.

In the known techniques for polyester production, addition of a potassium compound during polyester synthesis usually results in generation of internal particles and the resulting polyester gives a film having reduced transparency. In the present invention, however, the generation of internal particles is prevented because the kinds and amounts of additive ingredients including polycondensation catalysts have been optimized, so that a polyester film having excellent transparency is obtained.

Furthermore, in the present invention, since polycondensation catalysts are added after a poly(alkylene terephthalate) oligomer is depolymerized in the presence of a phosphorus compound and other ingredients, the formation of poly(alkylene terephthalate)-insoluble coarse particles due to interaction among the phosphorus compound, antimony trioxide, and the poly(alkylene terephthalate) is inhibited and hence transparency is not impaired.

The more preferable ranges of the amounts of a, b, b/a, c, d and (c+d) are those satisfying the following expressions.

| | |
|---|---|
| $10 \times 10^{-4} \leq a \leq 30 \times 10^{-4}$ | (1') |
| $5 \times 10^{-4} \leq b \leq 15 \times 10^{-4}$ | (2') |
| $0.4 \leq b/a \leq 0.8$ | (3') |
| $0.1 \times 10^{-4} \leq c \leq 1.5 \times 10^{-4}$ | (4') |
| $0.8 \times 10^{-4} \leq d \leq 2.0 \times 10^{-4}$ | (5') |
| $2.5 \times 10^{-4} \leq (c + d) \leq 4.0 \times 10^{-4}$ | (6') |

The present invention will be explained below in more detail by reference to Examples.

In the Examples, characteristic values, were examined as follows. The characteristic values described in the present specification may also be measured by the following methods.

(a) Intrinsic Viscosity [η]

Measured at 20.0° C. using as a solvent a 1:1 by weight mixture of phenol and tetrachloroethane.

Firstly, the relative viscosity ($\eta_{rel}$) was measured at 20° C. on the solution which was prepared by adding 0.2 g of sample to 40 ml of a mixture of equal weights of phenol and tetrachloroethane followed by heating at 100° C. for 35 minutes to dissolve it.

The intrinsic viscosity [η] was calculated by the following equation (the Huggins's equation).

$$[\eta] = \frac{-1 + \sqrt{1 + 4 \times 0.31(\eta_{rel} - 1)}}{2 \times 0.31 \times 0.5}$$

(b) b Value of Polymer (color tone)

The b value of a particulate polymer was measured with color-difference meter Type ND-Σ80, manufactured by Nippon Denshoku Kogyo Co., Ltd., Japan.

b Value indicates a yellow to blue color tone (positive values mean a yellowish tone and negative values mean a bluish tone). Smaller b values are preferred for polyesters, as long as the b values are not extremely small.

(c) Heat Resistance of Polymer

A dried polymer was allowed to reside in a melting extruder at 290° C. for 60 minutes in a nitrogen atmosphere and then extruded into strands. The extrudate was evaluated according to the following three ranks based on bubble inclusion and the retention of intrinsic viscosity.

Rank 1: slight bubble inclusion with a retention of intrinsic viscosity of 98% or higher.

Rank 2: medium bubble inclusion with a retention of intrinsic viscosity of 95% or higher and less than 98%.

Rank 3: considerable bubble inclusion with a retention of intrinsic viscosity less than 95%.

(d) Resistivity of Molten Polymer

Measured with the apparatus shown in FIG. 1.

In FIG. 1, numeral 1 denotes a direct current high-voltage generator, 2 an electrometer, 3 a high-voltage voltmeter, 4 a heating medium, 5 a polymer to be examined, 6 a cylindrical electrode, 7 a grounded main electrode, and 8 an insulator.

The resistivity R (Ω·cm) of the polymer is determined from the measured values of voltage V (volt) and current A (ampere) using the following equation:

$$R = V \cdot S / A \cdot L$$

wherein L is the electrode distance (cm) and S is the electrode surface area (cm²).

This resistivity can be used as criteria for electrostatic casting property.

(e) Electrostatic Casting Property

A polymer was cast from an extruder orifice while applying a voltage of 6 kV between the casting drum and an electrode disposed around the orifice above the extruded film. The electrostatic casting property of the polymer was judged based on whether a film was satisfactorily produced at a casting rate of 43 m/min.

The molten polymers having a resistivity of $1 \times 10^8$ ($\Omega \cdot cm$) or lower showed an almost satisfactory electrostatic casting property.

(f) Film Haze

A polymer was formed into a 12 μm-thick film, and the haze was measured with a haze meter 1001DP, manufactured by Nippon Denshoku Kogyo Co., Ltd., Japan.

(g) b Value of Film (color tone)

A film having a thickness of 12 μm, a width of 50 cm, and a length of 2,500 m was wound as a roll and examined to measure the b value of an edge side of the roll with color and color-difference meter CR-310, manufactured by Minolta Camera Co., Ltd., Japan.

(h) Surface State

A polymer was formed into a 12 μm-thick film, and the surface roughness was measured with a surface roughness meter manufactured by Kosaka Kenkyu-sho, Japan and evaluated according to the following four ranks.

Rank A: many projections and recesses of about 0.1 μm were observed.

Rank B: nearly rank A as a whole, but large projections and recesses of about 0.3 μm were observed in various places.

Rank C: nearly rank B as a whole, but large projections and recesses of about 0.5 μm were observed in various places.

Rank D: uneven surface with many projections and recesses larger than 0.5 μm in various places.

EXAMPLE 1

[Production of Base Polymer]

A slurry of terephthalic acid and ethylene glycol in a molar ratio of 1/1.6 was continuously fed into an esterification reactor containing bis(β-hydroxyethyl) terephthalate and an oligomer thereof. Esterification reaction was carried out under the conditions of 250° C., ordinary pressure, and a residence time of 6 hours. As a result, an esterification product having an average degree of polymerization of 7.1 was continuously obtained.

Into a polycondensation reactor was introduced 100 parts by weight of the esterification product. The contents were heated to 280° C., and $2.0 \times 10^{-4}$ mol of antimony trioxide was added as a catalyst per mol of the acid component. Thereafter, the pressure inside the reactor was reduced to 1 hPa, followed by polycondensation reaction for 180 minutes.

The polyester thus obtained had an [η] of 0.69 and a b value of 5.5.

[Production of Master Polymer]

Into a polycondensation reactor was introduced 100 parts by weight of an esterification product obtained in the same manner as the above. While the pressure inside the reactor was maintained at about 1,050 hPa under nitrogen gas atmosphere, the contents were heated to 280° C., and $20 \times 10^{-4}$ mol of potassium acetate and $10 \times 10^{-4}$ mol of triethyl phosphate were added per mol of the acid component. Further, an ethylene glycol slurry of silica having an average secondary-particle diameter of about 2.5 μm was added in an amount of 1.0 part by weight in terms of silica amount based on 100 parts by weight of the esterification product. Depolymerization was carried out for 40 minutes. Thereafter, $2.0 \times 10^{-4}$ mol of antimony trioxide and $1.0 \times 10^{-4}$ mol of germanium dioxide were added as catalysts per mol of the acid component. The pressure inside the reactor was then reduced to 1 hPa, followed by polycondensation reaction for 240 minutes.

The polyester thus obtained had an [η] of 0.71 and a b value of 11.4.

[Production of Film]

The base polymer and master polymer obtained by the methods described above were separately dried and then mixed with each other in a weight ratio of 92:8. The mixture was extruded into a sheet form with a melting extruder by the electrostatic casting method to obtain An unstretched film. This unstretched film was then simultaneously biaxially stretched, 3.3 times in the mechanical direction and 3.1 time in the transverse direction. Thus, a stretched film having a thickness of 12 μm was obtained.

As shown in Table 2, the polyester mixture showed a satisfactory electrostatic casting property, and the film obtained had excellent transparency and a satisfactory surface state.

EXAMPLES 2 TO 6 AND COMPARATIVE EXAMPLES 1 TO 5

Stretched films were produced in the same manner as in Example 1, except that the amounts of potassium acetate, triethyl phosphate, antimony trioxide, and germanium dioxide added for master polymer production and the time for polycondensation reaction were changed as shown in Table 1.

Properties of each master polymer, etc. are shown in Table 1, while the electrostatic casting property, properties of each stretched film, etc. are shown in Table 2.

COMPARATIVE EXAMPLES 6 AND 7

Master polymers were produced in the same manner as in Example 1, except that the addition amounts of antimony trioxide and germanium dioxide and the time for polycondensation reaction were changed as shown in Table 1.

Properties of each master polymer, etc. are shown in Table 1.

The polycondensation reactions proceeded slowly and took much time. Therefore, the polymers obtained had a poor color tone and the production efficiency was low.

COMPARATIVE EXAMPLE 8

A master polymer was produced in the same manner as in Example 1, except that the addition amounts of antimony trioxide and germanium dioxide were changed as shown in Table 1.

Properties of the master polymer, etc. are shown in Table 1.

Polymer gelation occurred during the polycondensation reaction, so that the polymer could not be formed into a film.

EXAMPLES 7 AND 8 AND COMPARATIVE EXAMPLE 9

Stretched films were produced in the same manner as in Example 1, except that in master polymer production, the depolymerization time beginning with the addition of potassium acetate, triethyl phosphate, and silica and ending with the addition of antimony trioxide and germanium dioxide was changed as shown in Table 1.

Properties of each master polymer, etc. are shown in Table 1, while the electrostatic casting property, properties of each stretched film, etc. are shown in Table 2.

EXAMPLES 9 AND 10 AND COMPARATIVE EXAMPLES 10 AND 11

Stretched films were produced in the same manner as in Example 1, except that the addition amount of the master polymer obtained in Example 1 was changed as shown in Table 2.

The electrostatic casting property, properties of each stretched film, etc. are shown in Table 2.

COMPARATIVE EXAMPLE 12

A stretched film was produced in the same manner as in Example 1, except that the intrinsic viscosity of the master polymer was changed as shown in Table 1.

Properties of the master polymer, etc. are shown in Table 1.

The film obtained had a low strength and could not be put to practical use.

TABLE 2

| | Amount of Master Polymer (wt %) | Heat Resistance | Resistivity ($10^8$ $\Omega \cdot cm$) | Electrostatic casting Property | Film Property | | |
|---|---|---|---|---|---|---|---|
| | | | | | Haze (%) | b Value | Surface state |
| Ex. 1 | 8.0 | 1 | 0.74 | good | 0.9 | 8.2 | A |
| Ex. 2 | 8.0 | 1 | 0.43 | good | 0.8 | 8.1 | A |
| Ex. 3 | 8.0 | 1 | 0.92 | good | 0.7 | 7.7 | A |
| Ex. 4 | 8.0 | 1 | 0.83 | good | 0.9 | 8.4 | A |
| Ex. 5 | 8.0 | 1 | 0.86 | good | 0.7 | 8.4 | A |
| Ex. 6 | 8.0 | 1 | 0.80 | good | 0.5 | 8.1 | A |
| Ex. 7 | 8.0 | 1 | 0.65 | good | 0.9 | 8.8 | A |
| Ex. 8 | 8.0 | 1 | 0.71 | good | 1.2 | 8.5 | A |
| Ex. 9 | 5.0 | 1 | 0.81 | good | 0.8 | 7.1 | A |
| Ex. 10 | 11.0 | 1 | 0.54 | good | 1.2 | 8.9 | A |
| Comp. Ex. 1 | 8.0 | 2 | 0.39 | good | 5.1 | 9.5 | C |
| Comp. Ex. 2 | 8.0 | 1 | 1.25 | poor | 0.8 | 8.3 | A |
| Comp. Ex. 3 | 8.0 | 1 | 1.54 | poor | 2.0 | 8.8 | A |
| Comp. Ex. 4 | 8.0 | 3 | 0.72 | good | 0.8 | 8.6 | A |

TABLE 1

| | Amount of Additive Added to Master Polymer | | | | Depolymerization time (min) | Polycondensation time (min) | Master Polymer | |
|---|---|---|---|---|---|---|---|---|
| | $a \times 10^4$ | $b \times 10^4$ | $c \times 10^4$ | $d \times 10^4$ | | | [η] | b Value |
| Ex. 1 | 20 | 10 | 2.0 | 1.0 | 40 | 240 | 0.71 | 11.4 |
| Ex. 2 | 40 | 20 | 2.0 | 1.5 | 40 | 290 | 0.68 | 11.7 |
| Ex. 3 | 10 | 5 | 1.0 | 1.5 | 40 | 185 | 0.69 | 10.3 |
| Ex. 4 | 20 | 20 | 2.0 | 1.0 | 40 | 260 | 0.71 | 11.5 |
| Ex. 5 | 20 | 10 | 1.0 | 2.0 | 40 | 230 | 0.70 | 11.6 |
| Ex. 6 | 20 | 10 | 0.1 | 4.0 | 40 | 225 | 0.72 | 10.0 |
| Ex. 7 | 20 | 10 | 2.0 | 1.0 | 60 | 245 | 0.71 | 12.3 |
| Ex. 8 | 20 | 10 | 2.0 | 1.0 | 80 | 245 | 0.69 | 12.6 |
| Comp. Ex. 1 | 80 | 20 | 2.0 | 1.0 | 40 | 300 | 0.62 | 13.9 |
| Comp. Ex. 2 | 2 | 10 | 2.0 | 1.0 | 40 | 185 | 0.68 | 11.5 |
| Comp. Ex. 3 | 10 | 20 | 2.0 | 1.0 | 40 | 190 | 0.70 | 12.0 |
| Comp. Ex. 4 | 20 | 2 | 2.0 | 1.0 | 40 | 220 | 0.66 | 12.1 |
| Comp. Ex. 5 | 20 | 10 | 4.0 | 0.5 | 40 | 200 | 0.76 | 12.3 |
| Comp. Ex. 6 | 20 | 10 | 2.0 | 0 | 40 | 400 | 0.68 | 17.9 |
| Comp. Ex. 7 | 20 | 10 | 1.5 | 0.5 | 40 | 360 | 0.70 | 18.7 |
| Comp. Ex. 8 | 20 | 10 | 2.0 | 6.0 | 40 | 120 | 0.79 | 12.8 |
| Comp. Ex. 9 | 20 | 10 | 2.0 | 1.0 | 10 | 220 | 0.69 | 11.9 |
| Comp. Ex. 12 | 20 | 10 | 2.0 | 1.0 | 40 | 230 | 0.42 | 7.8 |

TABLE 2-continued

| | Amount of Master Polymer (wt %) | Heat Resistance | Resistivity ($10^8$ $\Omega \cdot$ cm) | Electrostatic casting Property | Film Property Haze (%) | b Value | Surface state |
|---|---|---|---|---|---|---|---|
| Comp. Ex. 5 | 8.0 | 2 | 0.67 | good | 4.5 | 8.7 | C |
| Comp. Ex. 9 | 8.0 | 1 | 0.63 | good | 5.7 | 8.4 | C |
| Comp. Ex. 10 | 2.0 | 1 | 3.10 | very poor | 0.6 | 7.3 | A |
| Comp. Ex. 11 | 15.0 | 3 | 0.39 | good | 4.9 | 9.8 | A |

EXAMPLES 11 TO 13 AND COMPARATIVE EXAMPLE 13

Stretched films were produced in the same manner as in Example 1, except that the potassium compound and phosphorus compound used for master polymer production were changed to the compounds shown in Table 3. In Comparative Example 13, however, a magnesium compound was used in place of a potassium compound.

Properties of each master polymer, etc. are shown in Table 3, while the electrostatic casting property, properties of each stretched film, etc. are shown in Table 4.

TABLE 3

| | Additive to Master Polymer | | Depolymerization time (min) | Polycondensation time (min) | Master Polymer | |
|---|---|---|---|---|---|---|
| | Potassium compound | Phosphorus compound | | | [η] | b Value |
| Ex. 11 | potassium benzoate | triethyl phosphate | 40 | 240 | 0.67 | 11.5 |
| Ex. 12 | potassium acetate | trimethyl phosphate | 40 | 235 | 0.69 | 11.8 |
| Ex. 13 | potassium acetate | phosphoric acid | 40 | 210 | 0.71 | 9.4 |
| Comp. Ex. 13 | (magnesium acetate) | triethyl phosphate | 40 | 180 | 0.73 | 15.8 |

TABLE 4

| | Amount of Master Polymer (wt %) | Heat Resistance | Resistivity ($10^8$ $\Omega \cdot$ cm) | Electrostatic casting Property | Film Property Haze (%) | b Value | Surface state |
|---|---|---|---|---|---|---|---|
| Ex. 11 | 8.0 | 1 | 0.74 | good | 0.8 | 8.0 | A |
| Ex. 12 | 8.0 | 1 | 0.76 | good | 0.9 | 8.2 | A |
| Ex. 13 | 8.0 | 1 | 0.63 | good | 0.7 | 8.3 | A |
| Comp. Ex. 13 | 8.0 | 3 | 0.87 | good | 0.6 | 10.4 | A |

According to the present invention, a polyester film having an excellent color tone can be efficiently produced at a high operation efficiency.

While the invention has been described in detail and with reference to specific embodiments thereof, it will be apparent to one skilled in the art that various changes and modifications can be made therein without departing from the spirit and scope thereof.

What is claimed is:

1. A process for producing a master polymer for film production which comprises:

adding to a poly(alkylene terephthalate) oligomer having an average degree of polymerization of 10 or lower an alkylene glycol slurry of an inorganic lubricant, a potassium compound, and a phosphorus compound, the addition amounts of the potassium compound and the phosphorus compound satisfying the following expressions (1) to (3):

depolymerizing the oligomer;

adding antimony trioxide and germanium dioxide in respective amounts satisfying the following expressions (4) to (6); and then effecting polycondensation, $$5 \times 10^{-4} \leq a \leq 50 \times 10^{-4} \quad (1)$$
$$2.5 \times 10^{-4} \leq b \leq 25 \times 10^{-4} \quad (2)$$
$$0.15 \leq b/a \leq 1.5 \quad (3)$$
$$c \leq 2.5 \times 10^{-4} \quad (4)$$
$$0.5 \times 10^{-4} \leq d \leq 5 \times 10^{-4} \quad (5)$$
$$2.5 \times 10^{-4} \leq (c + d) \leq 5 \times 10^{-4} \quad (6)$$

wherein a, b, c, and d are the molar amounts of the potassium compound, phosphorus compound, antimony trioxide, and germanium dioxide, respectively, per mol of the terephthalic acid component constituting the oligomer.

2. The process for producing a master polymer for film production as claimed in claim 1, wherein the poly(alkylene terephthalate) oligomer is a poly(ethylene terephthalate) oligomer and the alkylene glycol is ethylene glycol.

3. The process for producing a master polymer for film production as claimed in claim 1, wherein the inorganic lubricant is silica.

4. The process for producing a master polymer for film production as claimed in claim 1, wherein the potassium compound is potassium acetate.

5. The process for producing a master polymer for film production as claimed in claim 1, wherein the phosphorus compound is triethyl phosphate.

6. The process for producing a master polymer for film production as claimed in claim 1, wherein the depolymerization is conducted for at least 30 minutes under an increased pressure at a temperature of 260° C. or higher.

7. The process for producing a master polymer for film production as claimed in any one of claims 1 to 6, wherein the master polymer has an intrinsic viscosity of 0.5 or higher.

8. The process for producing a master polymer for film production as claimed in claim 1, wherein the content of the inorganic lubricant in the master polymer is from 0.3 to 3% by weight.

9. A process for producing a polyester film which comprises:

melt-mixing (a) from 3 to 12 parts by weight of the master polymer obtained by the process of claim 1, which comprises a poly(alkylene terephthalate), and which contains from 0.3 to 3 wt % inorganic lubricant and has an intrinsic viscosity of 0.5 or higher with (b) from 97 to 88 parts by weight of a poly(alkylene terephthalate) which contains no inorganic lubricant and has an intrinsic viscosity of 0.5 or higher; and forming the resulting mixture into a film by the electrostatic casting method.

10. The process for producing a polyester film as claimed in claim 9, wherein the poly(alkylene terephthalate) is poly(ethylene terephthalate).

11. The process for producing a polyester film as claimed in claim 9, wherein the inorganic lubricant is silica.

12. The process for producing a polyester film as claimed in claim 9, wherein the potassium compound is potassium acetate.

13. The process for producing a polyester film as claimed in claim 9, wherein the phosphorus compound is triethyl phosphate.

* * * * *